July 7, 1953 L. SCHWAB 2,644,374
PAPERBOX COVERING MACHINE
Filed Nov. 12, 1948 7 Sheets-Sheet 3

INVENTOR.
LOUIS SCHWAB
BY
Zoltan Holachek
ATTORNEY

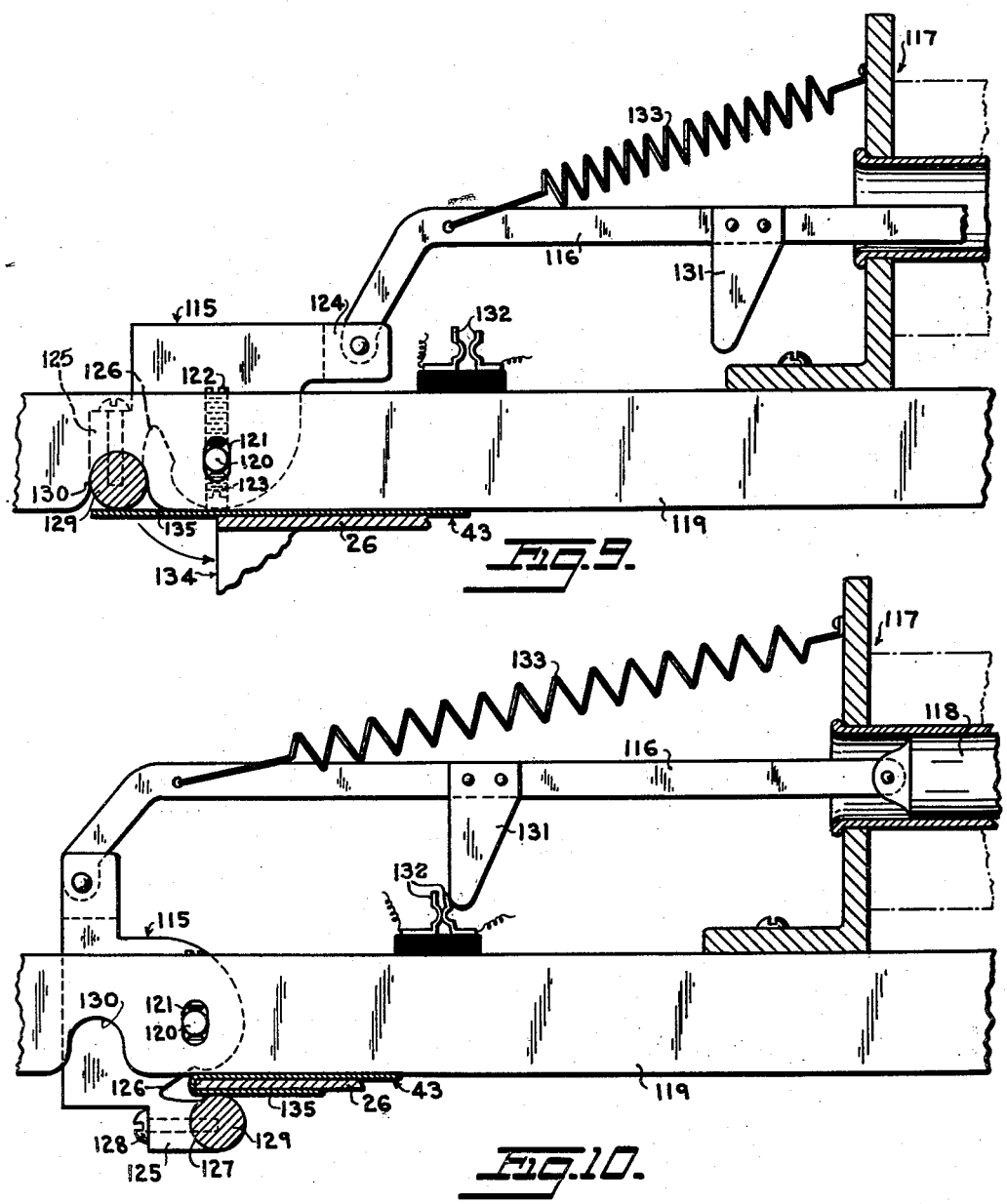

July 7, 1953  L. SCHWAB  2,644,374
PAPERBOX COVERING MACHINE
Filed Nov. 12, 1948  7 Sheets-Sheet 5
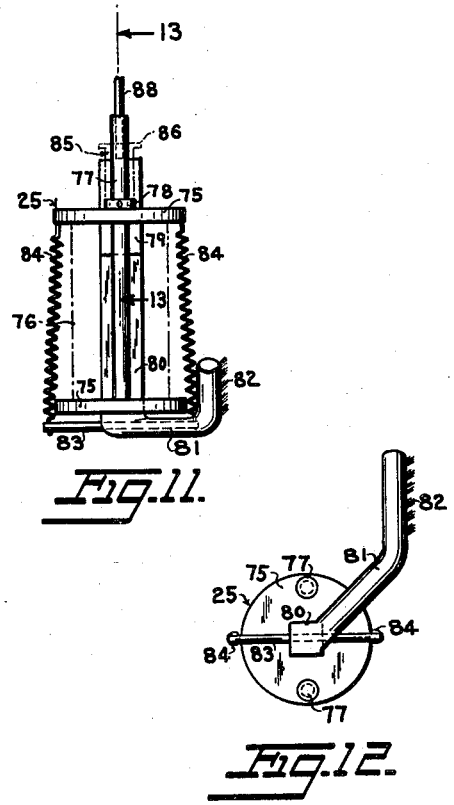
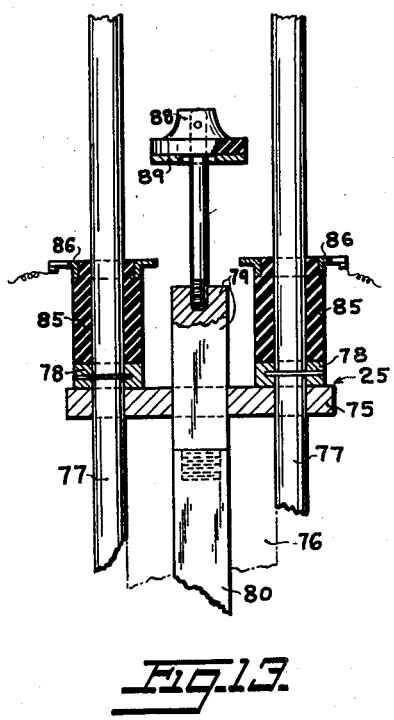
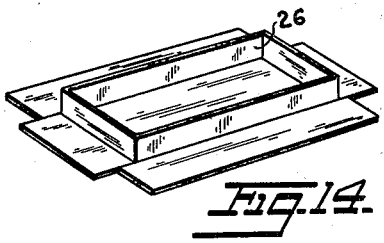
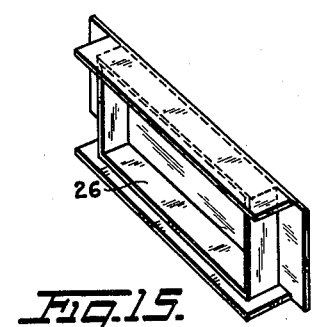
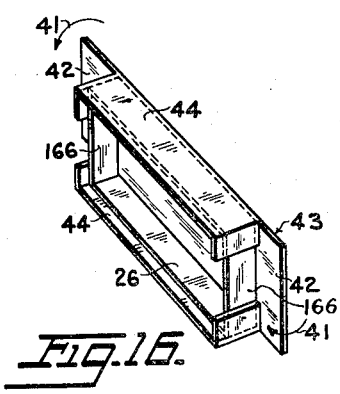
INVENTOR.
LOUIS SCHWAB
BY
ATTORNEY July 7, 1953 — L. SCHWAB — 2,644,374
PAPERBOX COVERING MACHINE
Filed Nov. 12, 1948 — 7 Sheets-Sheet 7

INVENTOR.
LOUIS SCHWAB
BY
ATTORNEY

Patented July 7, 1953

2,644,374

UNITED STATES PATENT OFFICE 2,644,374

PAPERBOX COVERING MACHINE

Louis Schwab, Astoria, N. Y.

Application November 12, 1948, Serial No. 59,731

3 Claims. (Cl. 93—54.3)

This invention relates to new and useful improvements in box covering machines, and, more particularly, the aim is to provide a novel and valuable such machine whereby a cardboard box may be covered with a paper wrapping adhesively coated all over its box engaging side.

As is well known, the boxes thus usually covered are of the open top rectangular kind, to be closed by a wholly separable lid of like kind; and since one or the other or both of such box components are desirably thus wrapped, it will be understood that whenever a box is herein referred to there is also or alternatively meant a box lid.

The paper wrapper employed is ordinarily a blank of cruciform outline, so that the central portion of the blank at its tackily adhesively coated side may be brought against the exterior of the bottom of the box. Assuming, for clarity of discussion, that the box is longer than it is wide, two of the arms of such cross are somewhat longer than the length of the box in order that, after the median portions of said arms are secured to the exteriors of the sides of the box, the terminal portions of said arms may next be laid down against the ends of the box; while the other two arms of said cross are each as long as the width of the box, so that these thereafter may be secured to said box ends and over said terminal portions of said longer arms. The final operation is an incurling of the marginal portions of the four arms, all thereof wider than the depth of the box, relative to the open mouth of the box, for laying down said marginal portions against the inside of the box all around the latter adjacent to its said open mouth. Said four arms will below be called the flaps.

According to the present invention, a relatively simple machine is provided, yet one capable of high speed of production of the wrapped boxes; whereby, after a box has had its wrapper applied thereto, either by another machine or manually, up to the point just short of the laying down of said terminal portions of the longer flaps over the ends of the box, the remaining operations are all rapidly, efficiently and in the proper sequence automatically performed. The instrumentalities for effecting said remaining operations may be mechanical and/or pneumatic and/or electrical in nature; and a now preferred arrangement, that illustrated herein, is one in which said instrumentalities are mainly electrically actuated and in part are also electronic.

A feature of the new machine, further, is its readily manually effected adjustability, over wide ranges, for boxes of different lengths, widths and depths.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 9 is a very much enlarged fragmentary vertical section, taken on the line 9—9 of Fig. 1.

Fig. 10 shows the parts of Fig. 9 redisposed after completion of the aforesaid final operation on the wrapper.

Fig. 11 is an enlarged side elevation of a solenoid, as viewed from the plane defined by the line 11—11 of Fig. 1.

Fig. 12 is a bottom plan view of said solenoid.

Fig. 13 is an enlarged fragmentary vertical section, taken on the line 13—13 of Fig. 11.

Fig. 14 illustrates in perspective a box as first placed on its wrapper.

Fig. 15 similarly illustrates these elements, but now with the longer flaps of the wrapper laid down on the sides of the box, and with the box now resting upright at one of its sides as it is first inserted into the machine and with its open mouth facing the front of the machine.

Figure 1:
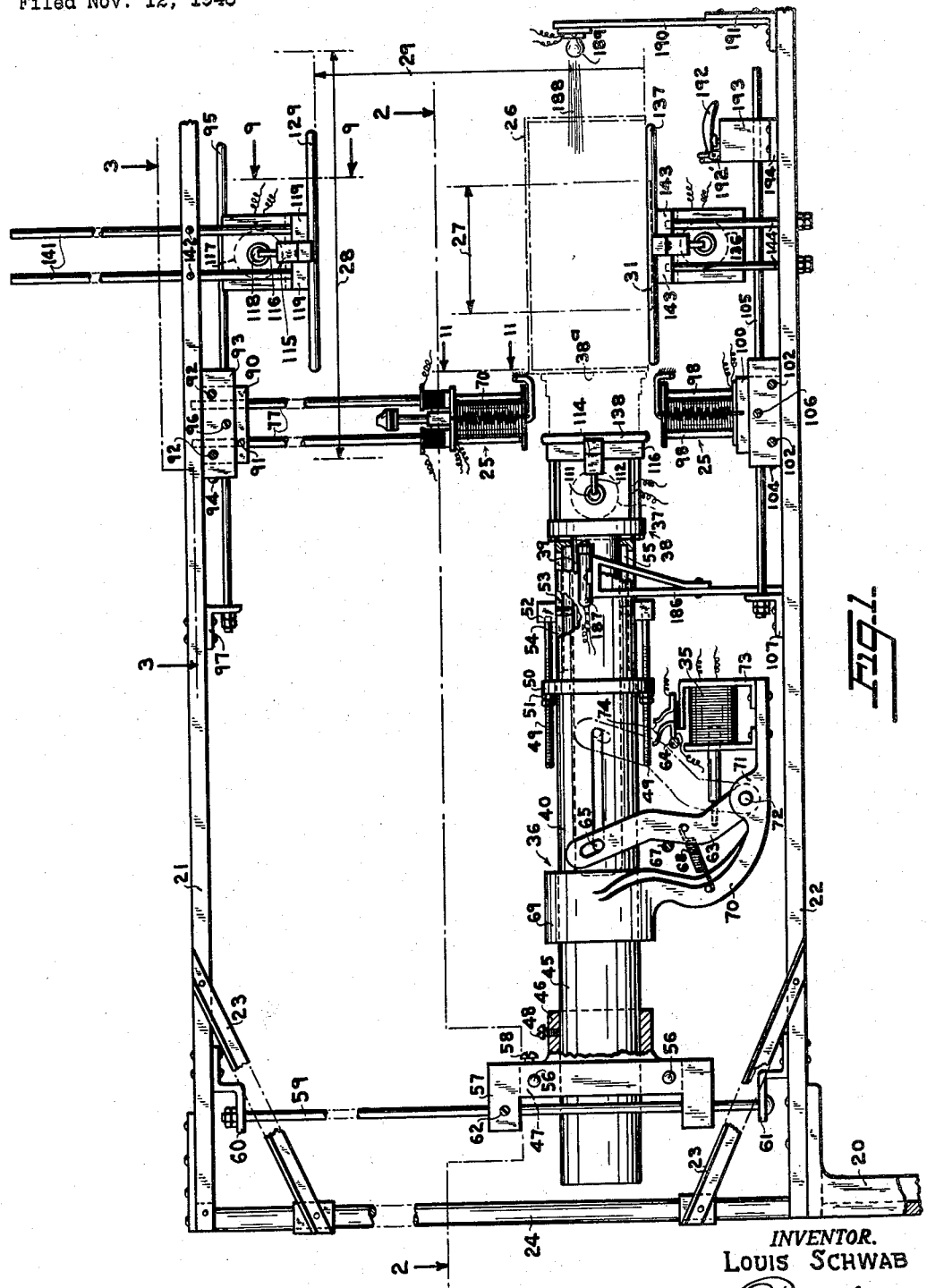
Fig. 1 is a front elevational view of the left-hand side of the box covering machine in accordance with the present invention.
Figure 17:
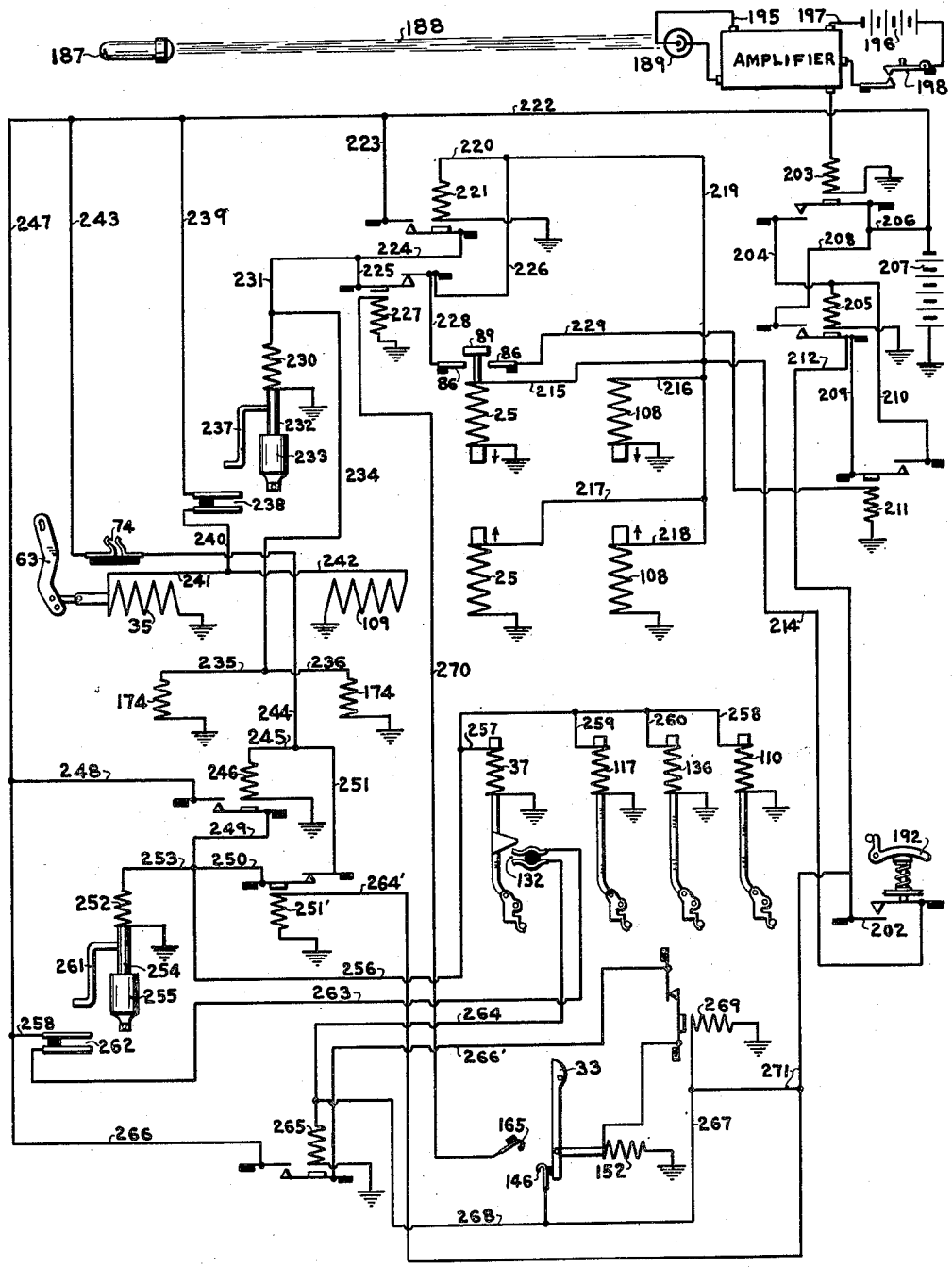

Fig. 16 similarly illustrates said elements, but now with the terminal portions of the longer flaps as laid down on the ends of the box by devices actuated on simultaneous energization of four solenoids like the one shown in Figs. 11–13 (two only of said solenoids being shown in the drawings, and these in Fig. 1; but with the remaining two thereof schematically indicated in Fig. 17); this laying down of said terminal flap portions being the first operation automatically performed by the machine.

Fig. 17 is an electrical diagram, one of the elements of which is an electronic means involving a light-source means and a so-called electric-eye here shown as in the form of a photoelectric tube.

Figure 2:
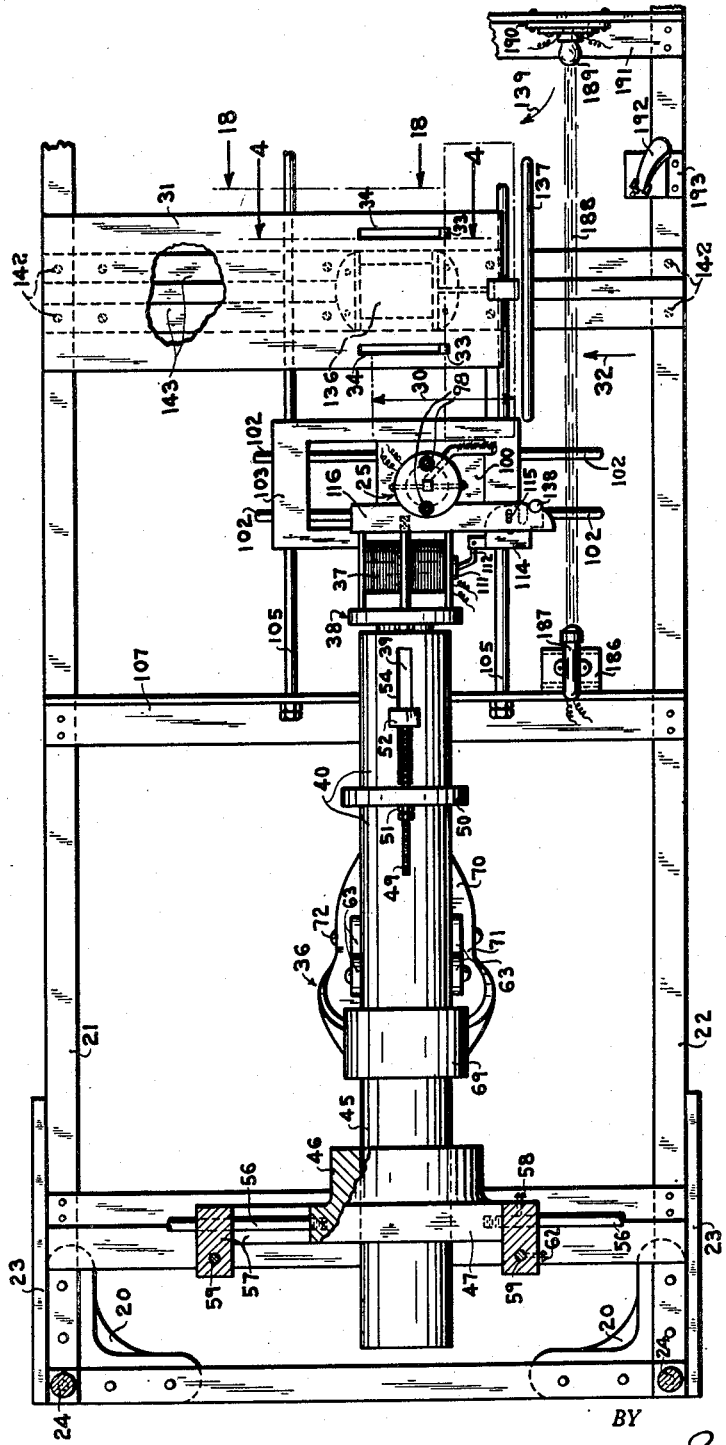
Fig. 2 is a horizontal section, taken on the line 2—2 of Fig. 1.
Figure 18:
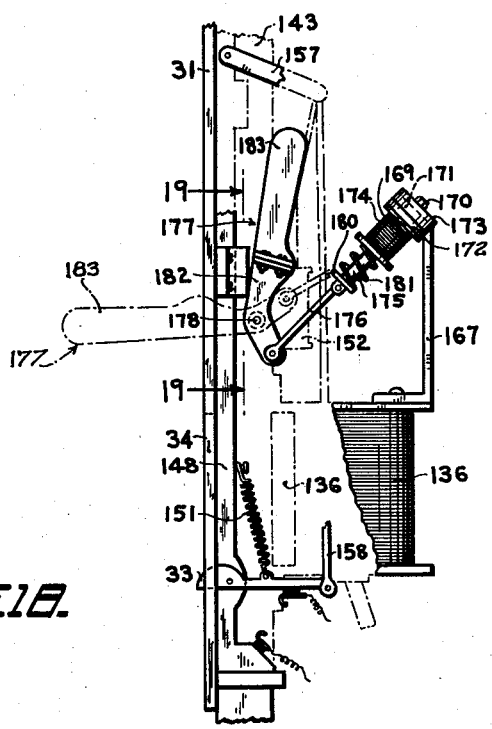

Fig. 18 is an enlarged fragmentary vertical section, taken on the line 18—18 of Fig. 2.

Figure 19:
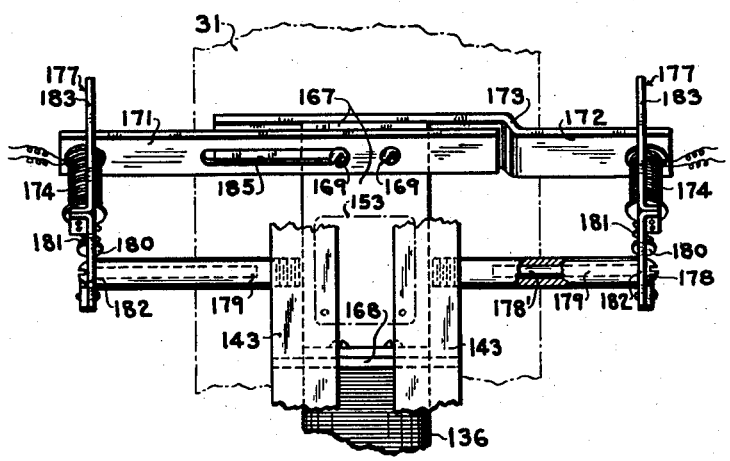

Fig. 19 is a horizontal section, taken on the line 19—19 of Fig. 18.

Figure 3:
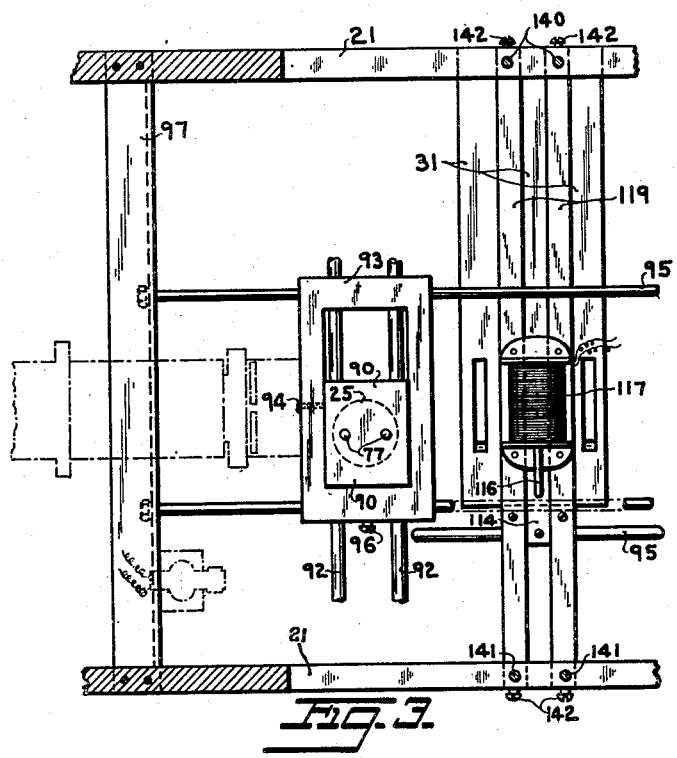
Fig. 3 is a fragmentary horizontal section, taken on the line 3—3 of Fig. 1.
Figure 6:
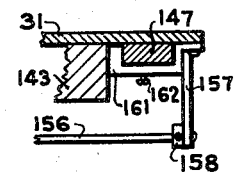
Fig. 6 is a detail view, this being a vertical section taken on the line 6—6 of Fig. 5.
Figures 4, 5:
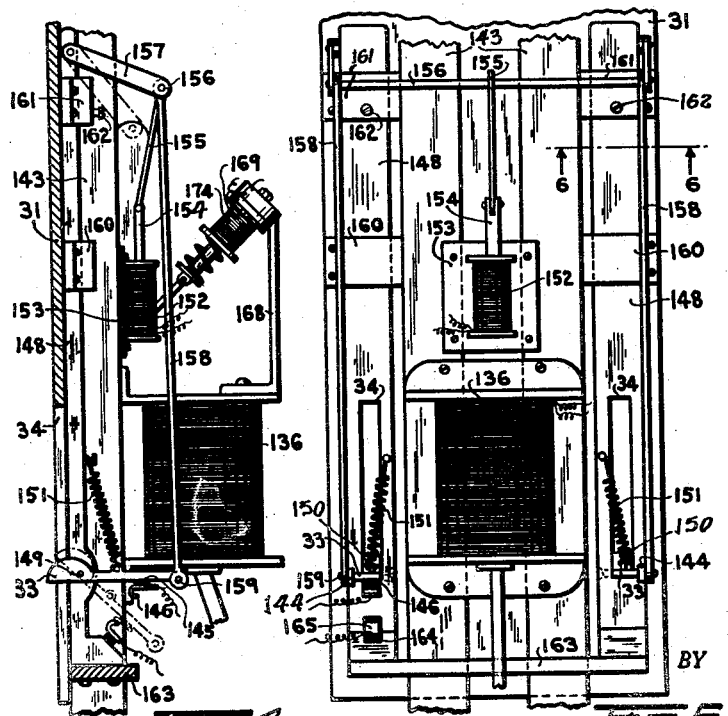
Fig. 4 is an enlarged fragmentary vertical section, taken on the line 4—4 of Fig. 2.
Fig. 5 is a bottom plan view of the assemblage shown in Fig. 4.

Before next taking up a fuller description of the machine, it is pointed out that, in order to avoid unnecessarily adding to the complexity of the drawings, various parts clearly disclosed in Figs. 4, 5, 9–13 and 19 and 20 are omitted from Figs. 1 and 2; and various parts located below the line 2—2 of Fig. 1 are omitted from Fig. 3, and the parts clearly disclosed in Fig. 4 when taken with Fig. 19 are omitted from Fig. 5.

Now referring to the drawings in detail, and first to Figs. 1 and 2, the machine, which may be supported at a convenient height on four legs two of which are marked 20 in these views, has a skeletal main structure comprised of four corner posts 24 which couple a top rectangular frame 21 and a bottom rectangular frame 22, with angle iron braces 23 employed at the front and back of the machine at the two ends thereof.

Four like solenoids 25 having armature-carried means for effecting the first operation, that of bringing about the condition shown in Fig. 16, are provided; two thereof being shown in Figs. 1 and 2, and the other two thereof, similarly placed in the machine at the opposite side of the box, the latter indicated in dot and dash lines at 26, in Fig. 1.

The variability of the machine, for taking care of boxes of different dimensions, may be assumed to be such that the box 26 is of a length about half-way, as indicated in Fig. 1, between a minimum length 27 and a maximum length 28, and said box 26 is of a height corresponding to the minimum box-height capacity of the machine but with the latter having a maximum box-height capacity 29, and said box is of a depth corresponding to the minimum box-depth capacity of the machine but with the latter having a maximum box-depth capacity as indicated at 30 in Fig. 2.

Regardless of the dimensions of a box, within the limits just noted, the box 26, with its wrapper partially applied thereto as shown in Fig. 15, is, from the front of the machine, placed in a platform 31, being manually centered laterally of the platform, and then thrust rearward in the direction of the arrow 32 of Fig. 2 until the now vertically arranged bottom of the box abuts two stops 33 projected upwardly by way of slots 34 in the platform.

The means for adjusting said stops along said slots, to locate the stops more or less toward the rear ends of the slots, in agreement with a box of greater depth than that illustrated for the box 26, will later be described.

Two like solenoids, one of which is marked 35 in Figs. 1 and 2, are parts of like mechanisms one of which is marked 36 in these views. Only one of these is shown in Figs. 1 and 2; however, since they are not only alike but the said mechanisms of which they form a part are also alike, a description of one will suffice as a description of both. These mechanisms are aligned horizontally and longitudinally of the machine and parallel with the front plane of the latter, and are equally spaced from the opposite sides of the platform 31.

Also included in the mechanism 36 is a second solenoid 37, the latter carried within a cage 38 fixed on the outer end of a cylindrical piston 39 in a cylindrically tubular cylinder 40. The solenoid 35 is for being energized after energization of the solenoids 25, and the solenoid 37 is for being energized following the energization and during a maintained energization of the solenoid 35; the arrangement being such that (a) on the energization of the solenoids 25 the aforesaid terminal portions 42 (now see Fig. 16) of the longer flaps of the wrapper 43 are folded down as indicated by the arrows 41 (Fig. 16) against the ends of the box 26, (b) on properly delayed subsequent energization of the solenoid 35 of the mechanism 36 the cage 38 is advanced to its dot and dash line position indicated at 38ᵃ in Fig. 1, thereby properly to advance the solenoid 37, and (c), properly thereafter, the marginal portions of the four flaps of the wrapper (such marginal portions of the longer flaps being marked 44 in Fig. 16) are incurled relative to the open mouth of the box for lying at the inside of the box, and so completing all operations of automatically covering the box with the wrapper.

In order that said position 38ᵃ of the cage 38 will be proper relative to the adjacent end of the box and also in order that said position of said cage will be proper relative to the depth of the box (as a factor determining the widths of the shorter flaps of the wrapper), and at the same time to arrange matters so that the full line position of the cage 38 will be suitably removed from the fields of operation of the parts operated by the solenoids 25, two adjustments of the mechanism 36 are provided for.

Said full line position of the cage 38 is predetermined by endwise adjustment of a solid cylindrical rear extension 45 from the cylinder 40 relative to a collar 46 offset from a slide-block 47, and this adjustment is secured by tightening a set-screw 48; and the dot and dash line position 38ᵃ of the cage 38 is predetermined by endwise adjustment of the threaded lengths of a pair of pull rods 49. Said rods 49, passing through apertures in an annular rib 50 on the cylinder 40, against which they may be tightened after their adjustment by nuts 51, carry block ends 52 offset from which are pins 53 extended through slots 54 along the opposite sides of the cylinder 40 and into matching slots 55 along the opposite sides of the piston 39.

Also, for positioning the mechanism 36 properly relative to the setting of the stops 33 in their slots 34, that is, relative to the depth of the box 26, the slide-block 47 is carried by rods 56 supported by and slidably adjustable relative to a slide-frame 57; this adjustment being secured by tightening a set-screw 58.

Further, for setting the mechanism 36 properly relative to the center of width of the box 26, the slide-frame 57 is vertically slidable on rods 59 secured at their tops to a Z-iron 60 fixed to the top frame 21 and at their bottoms to a Z-iron 61 fixed to the bottom frame 22; this adjustment being secured by tightening a set-screw 62.

The manner of adjusting the stops 33 pursuant to the width of the box 26 will be explained below.

On energization of the solenoid 35, its armature pivots a pair of like levers 63 from the full line to the dot and dash line positions of Fig. 1, and so against a suitable stop 64. Each of said levers, as best shown in Fig. 1, has a slotted upper end engaging a pin 65 offset from the piston 39 and projected through a slot 66 in the cylinder 40. Thus, a full throw of the levers 63, from a stop 67 to the stop 64, to tension springs 68 for at the proper time returning the levers to their full line positions, is effective to project the piston 39 only to the extent permitted by the setting of the pull rods 49. Integral with an annularly enlarged end portion 69 of the cylinder 40 is a downwardly and forwardly directed extension 70 carrying upstanding bosses 71 mounting a pin 72, this pin for fulcruming the two levers 63. Said extension also includes a floor portion on which the solenoid 35 is secured. One of the mounting brackets for said solenoid is of lazy-U shape as indicated at 73, and on the upper horizontal limb of said bracket is secured a block of insulation carrying a pair of normally spaced contacts 74.

Considering next the upper one of the two solenoids 25 shown in Fig. 1, and referring in this connection particularly to Figs. 11–13, this solenoid includes two circular plates 75 at the opposite ends of its winding 76; these plates being held together by the lower lengths of a pair of suspending rods 77 having enlarged lower ends (underlying the lower plate 75 as shown in Fig. 12) and having pinned thereto (overlyingly of the upper plate 75) collars 78. In order to obtain a good long throw of the solenoid's armature 79, this armature is made rather short; having threadedly connected thereto as shown in Figs. 11 to 13 a prolongation 80 of non-magnetic material. The armature guiding tunnel through the winding 76 is square in cross-section, as are the armature 79 and its prolongation 80, for maintaining offset as illustrated a specially shaped arm 81 desirably carrying a line of bristle or brush tufts 82 as shown.

Just below the lower one of said circular plates 75, a cross-pin 83 is fixedly carried at the inner end of the armature 81, and springs 84 join the outer ends of said cross-pin and the upper plate 75; this provision for restoring the parts to the condition shown in Figs. 11 and 13 when the solenoid 25 is deenergized.

On said rods 77, above the collars 78, are insulation sleeves 85, and set in their tops are a pair of contact cups 86. Screwed into the top of the armature 79 is a rod 87 carrying at its top an insulation head 88 having suitably secured to its bottom a metal annulus 89 for at the proper instant bridging the contacts 86.

In order that the solenoid 25 may be set at a level such that its arm 81 will be located as in Fig. 1, that is, at a level corresponding with the width of the box 26, the rods 77, see Figs. 1 and 3, are supported by and slidably adjustable vertically relative to a slide-block 90; this adjustment being secured by tightening a set-screw 91, see Fig. 1. The slide-block 90 is carried by rods 92 supported by and slidably adjustable relative to a slide-frame 93; this adjustment, for positioning the solenoid properly relative to the depth of the box 26, being secured by tightening a set-screw 94, see Figs. 1 and 3. The slide-frame 93 is carried by and is slidably adjustable along a pair of horizontal rods 95 extending longitudinally of the machine; this adjustment, for positioning the solenoid 25 properly relative to the length of the box 26, being secured by a set-screw 96, see Figs. 1 and 3. The ends of the rods 95 seen in Fig. 1 are secured to an angle-iron 97 extended across and secured to the upper frame 21; and the opposite ends of said rods are secured to a similar angle-iron, not shown, but spaced the same distance from the platform 31 as the angle-iron 97 is spaced from the latter.

Of the two solenoids 25 shown in Fig. 1, the lower one thereof is adjustable in all the ways, except in an up and down direction, as just described for the upper one of said solenoids. There is no need to change the elevation of said lower solenoid 25, as the top thereof should always be at the same level, that is, the level of the platform 31. For adjustment of said lower solenoid 25 (with the rods 98 functioning as do the rods 77 relative to the upper solenoid 25, but with said rods 98 at their lower ends fixed to a slide-block 100 corresponding to the slide-block 90), there are provided parts corresponding to the parts 92, 93, 94, 95, 96 and 97, and respectively marked, in Figs. 1 and 2, 102, 103, 104, 105, 106 and 107.

In all respects the two solenoids 25 are exactly alike, except that they are mounted so that their cores move toward one another as shown in Fig. 1, and except that only the upper solenoid has the elements 85—89; and the other two solenoids corresponding to the solenoids 25 at the opposite side of the platform 31 are both like the lower solenoid 25 and they are also mounted so that their cores move toward one another. Longitudinally of the machine, as will be understood, the two solenoids other than the solenoids 25 are spaced from the platform 31 the same distance as the solenoids 25 are spaced from said platform. The said elements 85—89 are provided in connection with only one of these four solenoids, since they all are simultaneously energized. In Fig. 17, however, the two of these solenoids not seen in Fig. 1 are marked 108.

Reverting to the mechanism 36, and the mechanism on the other side of the platform 31 corresponding mechanism 36, these mechanisms, exactly alike as already stated, do differ in one respect; which is that the contacts 74 are provided only in connection with the left hand mechanism 36, as shown in Fig. 1, as the solenoid 35 and the same solenoid of the other mechanism are simultaneously energized—the arrangement being such that on closing the contacts 74, and during maintenance of the energization of the solenoid 35 of the mechanism 36 and during energization of the same solenoid on the other mechanism, the solenoid 37 of said mechanism 36 and the same solenoid of the other mechanism will be energized. In Fig. 17, the solenoid corresponding to the solenoid 35 is marked 109, and the solenoid corresponding to the solenoid 37 is marked 110.

Considering now the parts operated by the solenoid 37, this solenoid is placed so that the direction of travel of its armature 111 is horizontal and forwardly of the machine. The forward end of said armature has pivotally connected thereto a substantially L-shaped link 112 pivotally connected to a special rocker 114 (Fig. 1) pivotally mounted at 115 between a pair of square cross-section bars 114' fixed on the outer end of the cage 38.

Referring to Figs. 9 and 10, the nature of said rocker may be understood when it is explained that the same is identical with the rocker 115 shown in the two last-named views; in which views, it may also be explained, the link 116 is identical with the link 112. (Note 115 at the upper part of Fig. 1.) In Fig. 10, for the solenoid 117 there partially shown (note 117 also at the upper part of Fig. 1), the armature 118 corresponds to the armature 111 of the solenoid 37. The placement of said rocker 115, and its associated parts 116—118, is as indicated in Figs. 1 and 2, that is, above the box 26.

Said rocker 115, having plain parallel sides as shown in Fig. 1, is pivotally hung between a pair of bars 119 of square cross-section, on a pin 120 received at its opposite end portions in aligned vertical slots through the bars 119 like the slot 121 in Figs. 9 and 10. The axis of said pin is adjustable toward and away from the box 26, by two set-screws 122 and 123, in accordance with the thickness of the sheet material from which the blank constituting the wrapper 43 is cut. The main body of the rocker 115, of the side elevational aspect shown in Figs. 9 and 10, has offset therefrom a fork extension 124, this for pivotal connection to the link 116, and a second extension 125 between which latter and said main body is a channel 126 of special cross-sectional shape. The extension 125 has a half-round groove 127 for having set therein, and detachably secured to the rocker, by means of a set-screw 128, a wiper-rod 129. For normally receiving the portions of said wiper-rod just beyond the opposite sides of the rocker, the two bars 119 have matching cut-outs 130, see Figs. 9 and 10.

A wiper-rod 138 corresponding to the wiper-rod 129, but of a length corresponding to the length of the box 26, is detachably secured to the rocker 115, in preparation for the run of a large plurality of such boxes through the machine.

Secured to the link 116 is a depending arm 131 for closing a pair of normally spaced contacts 132 when the rocker is disposed as in Fig. 10 due to energization of the solenoid 117; a spring 133 being provided to retract the armature 118 on deenergization of said solenoid.

As shown in Fig. 10, energization of the solenoid 117 participates in performing the aforesaid last operation in applying the wrapper 43 to the box 26, that is, of swinging in for adhesive securement to the inside of the box and adjacent to its open mouth 134 and at the side of the box then uppermost, the extended marginal portion 135 (Fig. 9) of the wrapper 43, thereby to dispose said portion 135 as in Fig. 10.

The solenoid 37 (Figs. 1 and 2) and its rocker 114 and their associated parts constitute an assembly which, with one exception, is exactly like that provided for the solenoid 117 and its rocker 115 as just above described; and this comment is true also in regard to the aforesaid solenoid 110 of the mechanism corresponding to the mechanism 36, and likewise true of the solenoid 136 seen at the bottom of Fig. 1 and also in Figs. 4 and 5. Said exception is that only the solenoid 117 has associated therewith the arm 131 and the contacts 132; this for the reason that the solenoids 37, 117, 110 and 136 are energized simultaneously.

However, these four solenoids are so placed, as will be noted particularly from Fig. 1, that while the wiper-rod 129 of the solenoid 117 extends horizontally and the pivotal axis of its carrying rocker is also horizontal for downward swing of said wiper-rod, the wiper-rod 137 of the solenoid 136, although also extended horizontally and with the pivotal axis of its carrying rocker also horizontal, is placed so that it is upwardly swung, and the wiper-rod 138 of the solenoid 37 extends vertically and the pivotal axis of its carrying rocker is also vertical for swing of said rod in a counter-clockwise direction as viewed in end elevation in Fig. 2. Similarly, the solenoid which, in the mechanism corresponding to the mechanism 36, corresponds to the solenoid 37, is so arranged that the rocker carrying its wiper-rod, although said rod is also extended vertically and with the pivotal axis of said rocker also vertical, will rock to swing its said wiper-rod in the direction of the arrow 139 of Fig. 2 on energization of said solenoid. As already stated, the solenoid which in the mechanism corresponding to the mechanism 36 corresponds to the solenoid 37, is indicated at 110 in Fig. 17.

As explained in connection with the wiper-rod 129, at the location of the wiper-rod 137 a substitute wiper-rod will be detachably secured which is of a length corresponding to the length of the box 26; and at the locations of the wiper-rod 138 and of the wiper-rod associated with the solenoid 110 there will be detachably secured substitute wiper-rods corresponding in length to the width of the box a large plurality of which are to be run through the machine.

For adjusting the placement of the solenoid 117 and its associated parts properly relative to the width of said box, that is, for lowering the bars 119 so as to have the wiper-rod 129 at a level appropriate to the width of the box, and referring now to Figs. 1 and 3, the bars 119 extend all the way across the width of the machine, and each of said bars, at each of its opposite ends, is fixed to one of a pair of rear vertical rods 140, see Fig. 3, and to one of a pair of front vertical rods 141, see Figs. 1 and 3, at the lower ends of said rods. These rods are raisable and lowerable through apertures in the top frame 21, and are set in adjusted position by the tightening of four set-screws 142.

There is no need to raise or lower the solenoid 136, as the wiper-rod 137 should always be located relative to the platform 31 as shown in Fig. 1. Therefore, this solenoid and its associated parts are carried by a pair of bars 143 similar to and extended as are the bars 119, but with said bars 143 anchored to the bottom frame 22 by two pairs of upstanding posts 144 as shown in Figs. 1 and 2.

Figure 7:
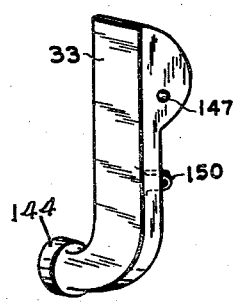
Fig. 7 is a perspective view of one of the two pivoted stops of Figs. 4 and 5.
Figure 8:
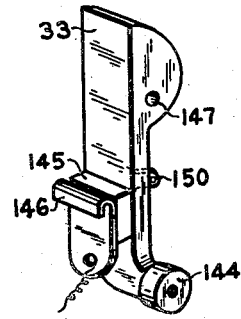
Fig. 8 is a similar view, but showing the other one of said stops.

Reverting to the stops 33, and now referring primarily to Figs. 2 and 4 to 8, these stops are identical, except that as to their bottom disk-enlargements 144 they are of opposite hand, as will be observed in Figs. 7 and 8; but it is to be noted that only one of the stops, that is, the stop 33 of Fig. 8, this being the near one in Fig. 4 and the one at the left in Fig. 5, carries an insulation block 145 mounting a contact 146. Each of the stops 33 is shaped to include a depending arm carrying at its bottom one of the enlargements 144, and also to include an apertured lug 150; and between each such lug and the adjacent one of a pair of slide-bars 148 a light spring 151 is extended.

Both of the stops 33 are rockable, to become disposed as indicated in dot and dash lines in Fig. 4, on energization of a solenoid 152 fixed on a plate 153 secured to the undersides of the bars 143. Said solenoid has its armature 154 connected by a link 155 to a cross-rod 156 pivotally coupled to a pair of like short links 157 and also a pair of like longer links 158. Each of the links 157 is pivotally hung from one of the slide-bars 148, and each of the links 158 at its forward end is pivotally connected as at 159 to the said dependent arm of the respective stop 33. Thus, when the solenoid 152 is energized, both stops will be simultaneously and similarly rocked to their dot and dash line positions indicated in Fig. 4.

In order to position the assembly just described properly relative to the depth of the box to be wrapped, each of the slide-bars 148, which are identical, is endwisely movable through guides 160 and 161. These four guides are alike, and of the cross-sectional shape shown in Fig. 6, except that it is the guides 161 only which carry set-screws 162 for securing the slide-bars as endwisely adjusted relative to said guides. In the shown adjustment of the parts, the stops 33 are set at the forward ends of the slots 34, in agreement with the depth of the box 26; which depth is as aforesaid the minimum box-depth for which the machine is assumed to be designed. The two slide-bars 148 are locked together at their forward ends by a tie-beam 163; and the slide-bar 148 nearest to the observer in Fig. 4, and at its forward end, carries an insulation block 164 mounting a contact 165 for coacting with the contact 146 on the adjacent stop 33, when both stops are retracted to the dot and dash line positions indicated in Fig. 4.

Referring to Figs. 15 and 16, it will be appreciated that, following the first operation of the machine on the box and its wrapper, this for redisposing the parts shown in Fig. 15 to the condition shown in Fig. 16, but before the solenoids 37, 110, 117 and 136 are energized to perform the final turning in operation on the wrapper about the four sides of the open mouth of the box by means of the four wiper-rods corresponding to the wiper-rod 129 (see again Figs. 9 and 10), the flaps 42 of Fig. 16 must be swung in to become adhesively laid against the ends of the box, these ends marked 166 in Fig. 16.

For performing the last-mentioned operation, the parts shown in Figs. 18 and 19 (and also partially in Fig. 4) are provided, viz:

A plate-like horizontal bracket 167 has an upstanding end secured as at 168 to the rear end plate of the solenoid 136, and this bracket at its rear end is rearwardly upwardly canted and has two bolt holes spaced laterally of the bracket. These holes are for taking bolts 169, tightenable by nuts 170, for holding as adjusted a flat bar 171 and a bar 172 like the bar 171 except for a Z-bend 173 in the latter. At the outer end of each of said bars a solenoid 174 is secured. Each such solenoid has its armature 175 pivotally connected to a link 176 pivotally connected at its opposite end to a wiper-blade 177 pivotally mounted at 178 to the outer end of a heavy rod 179 perpendicularly horizontally offset from and threadedly connected as indicated in Fig. 19 to the adjacent bar 143. Each armature 175 has a top enlargement 180 and therebelow is sleeved by a spring 181; said spring for holding the parts normally as in Fig. 18, and said enlargement for acting as a stop on energization of the associated solenoid.

Simultaneous energization of both the solenoids 174 sweeps both wiper-plates 177 to the dot and dash line positions indicated in Fig. 18, thereby to perform the operation last hereinabove referred.

The mechanism of Figs. 18 and 19 is also adjustable in all the respects required for proper functioning relative to a box of any length, width and depth within the capacity for which the machine is designed. The axes of the pivotal mountings 178 for the wiper-blades 177 are in the same vertical plane including the line 33 of Fig. 2. In order to give a sweep of greater radius to said blades, each of them comprises a permanently installed root portion 182, and a detachable outer section 183; and with a suitable plurality of the latter sections provided, these of different lengths, one may be readily substituted for another, by way of the flanges and bolt and nut means indicated at 184, for best adapting the machine to the width of each box of a plurality thereof to be run through the machine. The only other adjustment required is to space the solenoids 174 and their associated parts to agree with the length of said boxes, and this is readily effected (a) by loosening the nuts 170 and endwisely properly sliding apart the two bars 171 and 172—for which purpose the bar 171 is slotted as at 185, and the bar 172 is similarly slotted, and (b) by correspondingly telescopically adjusting, relative to the heavy rods 179, which are mainly tubes as indicated in Fig. 19, the rods 178' constituting parts of the pivotal mountings 178 for said wiper-blades.

From the foregoing description, the operation of the machine should be apparent, but, in order better to explain the timing of the mechanisms, and to describe the circuit connections responsible for their timing automatically, reference should be had to Fig. 17. Before examining this view, however, and now referring again to Figs. 1 and 2, it should preparatorily be further noted that, fixed on a bracket 186 upstanding from the angle-iron 187 of Fig. 1 is a barrel 187 enclosing a suitably electrically energized source for emitting a light beam 188 aimed at a photoelectric bulb 189 on an arm 190 upstanding from an angle-iron 191 extended across the machine and secured to the latter's bottom frame 22; and a manual control having its actuator in the form of a palm-lever 192 is pivotally mounted as at 192' on the top of a switch-box 193 having a bottom flange 194 secured to said bottom frame 22 at the front of and at a point slightly spaced from a point midway along the length of the machine.

Considering now Fig. 17, and first referring to the electric-eye apparatus as shown therein, the said photoelectric bulb 189 is in a closed circuit 195 with an amplifier connected to a current source 196 by way of a circuit 197 having also interposed therein a main hand-switch 198; and next referring to said palm-lever 192, it will be noted that this lever is for depression against the upper enlarged end of a stem 199 acted on by a spring 200 for normally holding the palm-lever elevated against a stop 201, and that the arrangement is such that when the palm-lever is manually depressed said stem is moved downward thereby to close a normally open switch 202.

The operation of the machine, with the switch 198 closed, is, as shown in Fig. 17, electrically as follows:

(1) In the course of advancing a first box of a run of such boxes to be put through the machine, toward placement on the platform 31 (such box as aforesaid partially previously covered by an adhesively coated wrapper as in Fig. 15, and said box as thus advanced being upright on one of its longer sides as shown also in Fig. 15), the light beam 188 is necessarily interrupted by an arm or the arms of the attendant; and as a result the following things occur:

(a) A relay 203 normally energized by current from the amplifier is deenergized, thereby closing a circuit 204 for a first stick or lock relay 205 and served by a lead 206 from a current source 207; this relay 205 being a lock relay by virtue of the fact that associated therewith is a lock circuit including the leads 208, 209 and 210—which lock circuit is to be broken later by energization of a release relay 211 interposed therein.

(b) Also, a lead 212 in parallel with the lead 209 from the lock relay 205 is placed in a circuit also including a lead 214 and the open switch 202, thereby to permit energization of the last-named circuit on manual depression of the palm-lever 192.

(2) When the attendant at the machine has advanced the box along the platform 31 until the box abuts the stops 33, he, in sweeping his hand out of the machine, fleetingly bears down on the palm-lever, thereby closing the switch 202; and as a result the following things occur:

(a) By way of said lead 214, and via four branch leads therefrom 215, 216, 217 and 218, all the first-operation solenoids, that is, the two solenoids 25 and the two solenoids 108, are simultaneously energized; thereby disposing the wrapper relative to the box as shown in Fig. 16.

(b) By way of a lead 219 also branched from the lead 214, a circuit 220 for a second lock relay 221 is closed; this being a lock relay by virtue of the fact that associated therewith is a lock circuit including the leads 206, 222, 223, 224, 225 and 226—which lock circuit is to be broken later by energization of a release relay 227 interposed therein.

(c) By way of a lead 228 branched from the lead 226, one of the contacts 86 is energized by the last-named lock circuit, and, the armatures of the four solenoids 25 and 108 having by now been snappingly retracted by the springs 84, see Fig. 11, the annulus 89 bridges the contacts 86; and consequently.

(d) By way of the leads 206, 222, 223, 228, said contacts, and a lead 229, the release relay 211 is energized, thereby breaking the lock circuit for the first lock relay 205.

(e) Simultaneously, a first auxiliary solenoid 230 is energized, by way of the leads 206, 222, 223, 224 and a lead 231—said solenoid having its armature 232 arranged for endwise movement through a dashpot 233, for the purpose of suitably delaying, beyond the completion of the operation next-mentioned on the box and its wrapper, the energization of the solenoid 35 concurrently with energization of the solenoid 109.

(f) During such delay, the two solenoids 174 are energized, for operating the wiper-blades 177 of Figs. 18 and 19, by way of a lead 234 from the lead 231 and by way of the leads 235 and 236.

(3) At the proper instant, an arm 237 fixed on the armature 232 of the first auxiliary solenoid 230 engages and closes a pair of normally spaced contacts 238, thereby energizing the solenoids 35 and 109, by way of the leads 206, 222 and 239, said contacts 238, and leads 240, 241 and 242, and so advancing the mechanism 36 from its full line to its dot and dash line position (note 33ª in Fig. 1) and similarly advancing but in the opposite direction the mechanism corresponding to the mechanism 36 and at the other end of the machine; these mechanisms remaining as thus advanced until, at a later time, the release relay 227 for the lock relay 221 is energized.

(4) Coincidentally with the arrival of the mechanism 36 and the corresponding mechanism at their advanced positions, the lever 63 associated with the solenoid 35 closes the contacts 74; as a result of which the following things occur:

(a) By way of the leads 206, 222 and 243, said contacts 74, and a lead 244, a circuit 245 for a third lock relay 246 is closed; this relay being a lock relay by virtue of the fact that associated therewith is a lock circuit including the leads 206, 222, 247, 248, 249, 250, 251 and 245—which lock circuit is to be opened later by energization of a release relay 251' interposed therein.

(b) Simultaneously, a second auxiliary solenoid 252 is energized, by way of the leads 206, 222, 247, 248, 249 and 253—said solenoid, having its armature 254 arranged for endwise movement through a dashpot 255, being effective suitably to hold the solenoids 35 and 109 at their said advanced positions—this halt of these solenoids at such positions being for an interval long enough to permit not only energization of the four solenoids 37, 110, 117 and 136 (for performing the final or inturning operation of the wrapper relative to the open mouth of the box), but also to allow for the wiper-rods actuated by the four last-named solenoids to be thereafter cleared away from the box.

(c) Simultaneously with (b) immediately above, said four last-named solenoids are energized, by way of the leads 206, 222, 247, 248, 249, 256, and the leads 257, 258, 259 and 260 branched from the lead 256 and connected respectively to said solenoids 37, 110, 117 and 136.

(5) Following energization of the four solenoids last-named, an arm 261 on the armature 254 of the second auxiliary solenoid 252 engages and closes a pair of normally spaced contacts 263; and as a result the following things occur:

(a) One of the pair of contacts 132 to be closed at the end of the working throw of the armature of the solenoid 37 is energized by way of a lead 263 from said contacts 262, now closed.

(b) By way of a lead 264 from the other contact 132, the release relay 251 for the third lock circuit is energized, thereby breaking this lock circuit.

(c) By way of said contacts 132 and said head 264 therefrom, and a lead 264' from the latter, a circuit for a fourth lock relay 265 is closed; this relay being a lock relay by virtue of the fact that associated therewith is a lock circuit including the leads 206, 222, 247, 266, 266', 267 and 268—which lock circuit is to be broken later by energization of a release relay 269 interposed therein.

(d) The solenoid 152 for retracting the stops 33 is energized, said solenoid interposed in the last-named lock circuit; to allow the now completely wrapped box to be further advanced along the platform 31.

(e) Now one of the stops 33 has brought together the contacts 146 and 165, and, by way of a circuit including the lead 270 from the contact 165, the release relay 227 for the second lock circuit including the lock relay 221 is energized, thereby breaking said lock circuit.

(6) Incidental to the attendant now advancing, as explained under (1) above, the next box and its wrapper toward placement on the platform 31 (he having heard the click of operation of the stops 33), the light beam 188 is again necessarily interrupted; with the result that once again, as above, the relay 203 is deenergized, and consequently the first lock circuit including the lock relay 205 is reenergized.

(7) Since now the solenoid 152 is still holding the stops 33 retracted, the last-named box, on further manual advance thereof, pushes the box ahead of it beyond said stops.

(8) When the attendant perceives he has advanced said last-named box sufficiently to push ahead of it said first box to an extent to force the latter past said stops, he again, in swinging one of his hands out of the machine, fleetingly brings such hand down on the palm-lever 192, thereby once more closing the switch 202; and as a result the following things occur:

(a) By way of the lead 271 branched from the lead 212, the latter now energizable via the first lock circuit now once again closed as per (6) above, the release relay 269 for the fourth lock relay 265 is energized, with the result that, coincidently with the breaking of this lock circuit, the solenoid 152 is deenergized; and (b) The stops 33 return to normal position, and in time properly to halt further rearward advance of the second-named box.

(9) The attendant, now using both hands again or say his hand other than the one last-mentioned, effects such further forward advance of said second-named box, until this advance is halted by said second-named box encountering the stops 33.

(10) Finally the attendant, in now removing his last-named hand from the machine, once more fleetingly manually bears down on the palm-lever 192, thereby starting the full automatic cycle of the sequential operations above described under all of (2) above beginning with (a) thereof and under all of (3), (4) and (5) above.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a machine operable relative to a four-sided open-top box and an adhesively coated wrapper preparatorily applied at its coated side to the exterior of the box and merely at a central portion of the wrapper to the bottom of the box and at two opposite side portions of the wrapper to two opposite sides of the box, in combination, an electromagnetically operated means for first applying the four terminal subdivisions of said side portions of the wrapper to the other two sides of the box, an electromagnetically operated means for next applying the other two opposite side portions of the wrapper to the two last-named sides of the box, said four side portions of the wrapper being so dimensioned that after the operations of the two means aforesaid marginal subdivisions of the wrapper are extended beyond the plane of the open top of the box all around said top, an electromagnetically operated means for inturning all said marginal subdivisions into the interior of the box and laying the same against said interior all around and adjacent to said top, an automatically functioning circuit connecting said first, second and third means together for timing a cycle of operations of the machine during which the second-named means is actuated following actuation of the first-named means and the third-named means is actuated following actuation of the second-named means, a control means in said circuit including a manual actuator, an electric-eye means, a platform for receiving and supporting and allowing passage therealong of a box and its wrapper, a stop means for halting advance of the box and its wrapper beyond a predetermined location on the platform and thereby detaining the box and its wrapper adjacent to the fields of operation of the three first-named means, and means responsive to an actinical change of condition of said electric-eye means for retracting said stop means to allow passage therebeyond of the wrapped box.

2. In a machine operable relative to a four-sided open-top box and an adhesively coated wrapper preparatorily applied at its coated side to the exterior of the box and merely at a central portion of the wrapper to the bottom of the box and at two opposite side portions of the wrapper to two opposite sides of the box, in combination, an electromagnetically operated means for first applying the four terminal subdivisions of said side portions of the wrapper to the other two sides of the box, an electromagnetically operated means for next applying the other two opposite side portions of the wrapper to the two last-named sides of the box, said four side portions of the wrapper being so dimensioned that after the operations of the two means aforesaid marginal subdivisions of the wrapper are extended beyond the plane of the open top of the box all around said top, an electromagnetically operated means for inturning all said marginal subdivisions into the interior of the box and laying the same against said interior all around and adjacent to said top, an automatically functioning circuit connecting said first, second and third means together for timing a cycle of operations of the machine during which the second-named means is actuated following actuation of the first-named means and the third-named means is actuated following actuation of the second-named means, a control means in said circuit including a manual actuator, an electric-eye means for controlling energization of said circuit, a platform for receiving and supporting and allowing passage therealong of a box and its wrapper, a stop means for halting advance of the box and its wrapper beyond a predetermined location on the platform and thereby detaining the box and its wrapper adjacent to the fields of operation of the three first-named means, means responsive to an actinical change of condition of said electric-eye means for retracting said stop means to allow passage therebeyond of the wrapped box, and means for manually preadjusting said stop means to have a field of operation corresponding to the dimensions of the box.

3. In a machine operable relative to a four-sided open-top box and an adhesively coated wrapper preparatorily applied at its coated side to the exterior of the box and merely at a central portion of the wrapper to the bottom of the box and at two opposite side portions of the wrapper to two opposite sides of the box, in combination, an electromagnetically operated means for first applying the four terminal subdivisions of said side portions of the wrapper to the other two sides of the box, an electromagnetically operated means for next applying the other two opposite side portions of the wrapper to the two last-named sides of the box, said four side portions of the wrapper being so dimensioned that after the operations of the two means aforesaid marginal subdivisions of the wrapper are extended beyond the plane of the open top of the box all around said top, and electromagnetically operated means for inturning all said marginal subdivisions into the interior of the box and laying the same against said interior all around and adjacent to said top, an automatically functioning circuit connecting said first, second and third means together for timing a cycle of operations of the machine during which the second-named means is actuated following actuation of the first-named means and the third-named means is actuated following actuation of the second-named means, a control means in said circuit including a manual actuator, an electric-eye means for controlling energization of said circuit, a platform for receiving and supporting and allowing passage therealong of a box and its wrapper, a stop means for halting advance of the box and its wrapper beyond a predetermined location on the platform and thereby detaining the box and its wrapper adjacent to the fields of operation of the three first-named means, and means responsive to an actinical change of condition of said electric-eye means for retracting said stop means to allow passage therebeyond of the wrapped box, said stop means comprising parallel bars slidably positioned beneath the platform to slide in a direction parallel to the path of movement of the box body on the platform, means connecting said bars together for uniform sliding movements, elongated stop members pivotally supported intermediate of their ends on said bars, the platform having elongated slats aligned with said stop members and through which the top ends of said stop members project to be engaged by said box body, means holding said stop members in pivoted positions with their top ends extended through said slats, and means holding said bars in desired shifted positions relative to the platform to locate said stop members to have field of operation corresponding to the dimensions of the box body.

LOUIS SCHWAB.

References Cited in the file of this patent

UNITED STATES PATENTS

| Number | Name | Date |
|---|---|---|
| 691,329 | Smith | Jan. 14, 1902 |
| 1,251,811 | Peters et al. | Jan. 1, 1918 |
| 2,292,487 | Stevens | Aug. 11, 1942 |
| 2,403,394 | Preston | July 2, 1946 |
| 2,464,556 | Clark | Mar. 15, 1949 |
| 2,516,454 | Doran | July 25, 1950 |